(12) United States Patent
Huber, Jr.

(10) Patent No.: US 6,227,520 B1
(45) Date of Patent: May 8, 2001

(54) DIAPHRAGM PISTON VALVE

(75) Inventor: Howard E. Huber, Jr., Black River, NY (US)

(73) Assignee: New York Air Brake Corporation, Watertown, NY (US)

( * ) Notice: Subject to any disclaimer, the term of this patent is extended or adjusted under 35 U.S.C. 154(b) by 0 days.

(21) Appl. No.: 09/232,720

(22) Filed: Jan. 19, 1999

(51) Int. Cl.[7] ............................................... F16K 31/126
(52) U.S. Cl. .................... 251/61.5; 251/335.2; 92/100
(58) Field of Search ........................ 92/100, 130 R; 251/61.2, 61, 61.5, 335.2; 137/505.42

(56) References Cited

U.S. PATENT DOCUMENTS

| | | | |
|---|---|---|---|
| 2,595,156 | * 4/1952 | Matasovic | 137/505.42 |
| 2,876,793 | * 3/1959 | Vanderpoel et al. | 137/505.42 |
| 3,614,055 | * 10/1971 | Douglas | 251/61.2 |
| 3,874,629 | * 4/1975 | Fontaine | 251/61.5 X |
| 4,206,901 | * 6/1980 | Williams | 251/35 |
| 4,424,738 | * 1/1984 | Leighton | 251/61.5 X |
| 4,693,267 | * 9/1987 | Patterson | 137/505.42 X |
| 5,294,090 | * 3/1994 | Winnike | 251/36 |
| 5,387,030 | 2/1995 | Gayfer et al. . | |
| 5,724,881 | * 3/1998 | Reynolds | 92/100 |
| 5,941,280 | * 8/1999 | Hart et al. | 251/61.2 X |
| 5,971,498 | * 10/1999 | Engle | 303/3 |

FOREIGN PATENT DOCUMENTS

712831  * 10/1931  (FR) ................. 137/625.34

* cited by examiner

*Primary Examiner*—Kevin Shaver
*Assistant Examiner*—John Bastianelli
(74) *Attorney, Agent, or Firm*—Barnes & Thornburg

(57) ABSTRACT

A diaphragm piston having a diaphragm between a body and plate. A post integral with and extends from the body through the diaphragm and the plate. A stop is coupled to the post and limits the axial movement of the plate away from the body. A spring seat is coupled to the post. A spring is between the plate and the spring seat. The post includes a first shoulder and the stop engages the first shoulder. The stop includes an orifice shaped to move axially on the post past the first shoulder and rotate about the post and engage the first shoulder. The first shoulder has at least one circumferential recess and the orifice in the stop includes a radial tab smaller than the recess. A first lock prevents rotation between the stop and the post. A second lock is also provided preventing rotation between the plate and post. A unique stem which guides the diaphragm piston in a valve seat is provided.

31 Claims, 4 Drawing Sheets

DIAPHRAGM PISTON VALVE

BACKGROUND AND SUMMARY OF THE INVENTION

The present invention relates generally to pistons and more specifically, to an improved diaphragm piston.

Diaphragm pistons, for example, for use in a service portion of a rail pneumatic brake valve, for example, a DB-60 brake valve available from New York Air Brake Corporation, is illustrated in FIGS. 1 and 2. The diaphragm piston includes a rubber diaphragm 24 held between a body 20 and a plate 28 which is secured together by a post 10 having a head 12 and a threaded portion 16 which receives a nut 34. A spring 36 is positioned between a spring seat 38 and the back side of the plate 28. A retainer 40, secured to the post 10 by C-ring 42, acts as a stop for the spring seat 38. A stem 45 is inserted into and is secured to post 10 by aligning orifices 19 and 46 and pin 47. Stem 45 is received and guided in a bushing of a valve seat (shown in phantom). The stem 45 includes a shoulder 44 which can catch and wear the valve seat bushing.

Other than the rubber diaphragm 24, all of the parts are metal. In that all of the parts are metal, the post 10 requires processing to create the different areas, including the threading. The number of parts increase the expense of the diaphragm piston. Also, there is no mechanism to prevent rotation of the elements relative to each other.

The present invention is a diaphragm piston having a diaphragm between a body and plate. A post integral with and extends from the body through the diaphragm and the plate. A stop is coupled to the post and limits the axial movement of the plate away from the body. A spring seat is coupled to the post. A spring is between the plate and the spring seat. The post includes a first shoulder and the stop engages the first shoulder. The stop includes an orifice shaped to move axially on the post past the first shoulder and rotate about the post and engage the first shoulder. The first shoulder has at least one circumferential recess and the orifice in the stop includes a radial tab smaller than the recess.

A first lock prevents rotation between the stop and the post. The lock includes a recess on both the stop and the plate and a key is inserted in the recess when aligned. The spring retains the key in the recess. A second lock is also provided preventing rotation between the plate and post. The second lock includes at least one pin and a recess, one of which is on the plate and one of which is on the body.

The post includes a second shoulder and the spring seat engages the second shoulder. The spring seat includes an orifice shape to move axially on the post past the second shoulder and rotate about the post and engage the second shoulder. The second shoulder for the spring seat includes a first portion having a generally first polygonal shape and a second portion having a generally second polygonal shape of more sides than the first shape. The orifice in the spring seat is shaped to move axially past the first portion of the second shoulder and rotate about the post and engage the second portion of the second shoulder. Preferably, the first polygonal shape is generally a triangular shape and the second polygonal shape is generally an hexagonal shape.

A unique relationship between the piston guide stem and valve seat is provided. A guide is integral with and extends from the body in a direction opposite from the direction the post extends from the body. A stem is loosely seated in an orifice of the guide. The stem includes a uniform diameter, with circumferentially spaced flats, which maintains guiding contacts with a bushing of a valve seat over the total travel of the piston.

Whereas the diaphragm is rubber, the body, the plate and the lock that prevents rotation between the stop are all made of plastic. The stem, spring seat and the spring are made of metal.

Other objects, advantages and novel features of the present invention will become apparent from the following detailed description of the invention when considered in conjunction with the accompanying drawings.

DETAILED DESCRIPTION OF THE PRIOR ART

Figure 1:
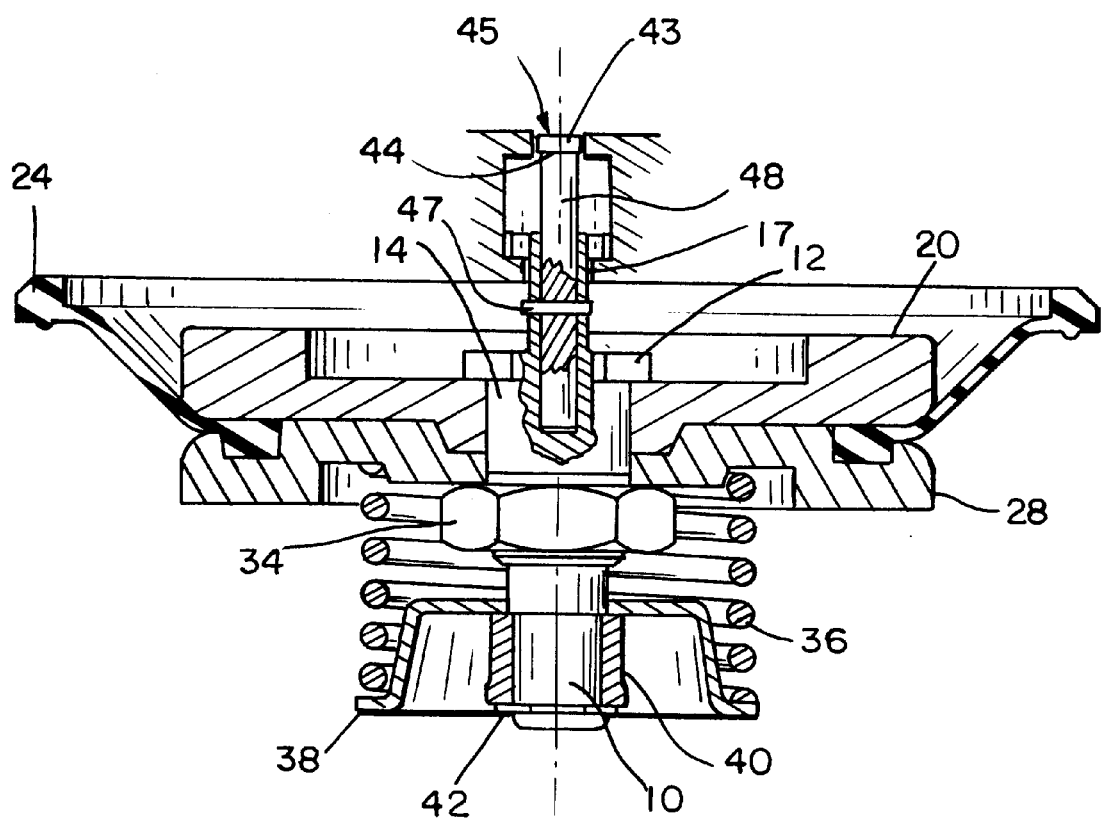
FIG. 1 is a cross-sectional view of a diaphragm piston according to the prior art.
Figure 2:
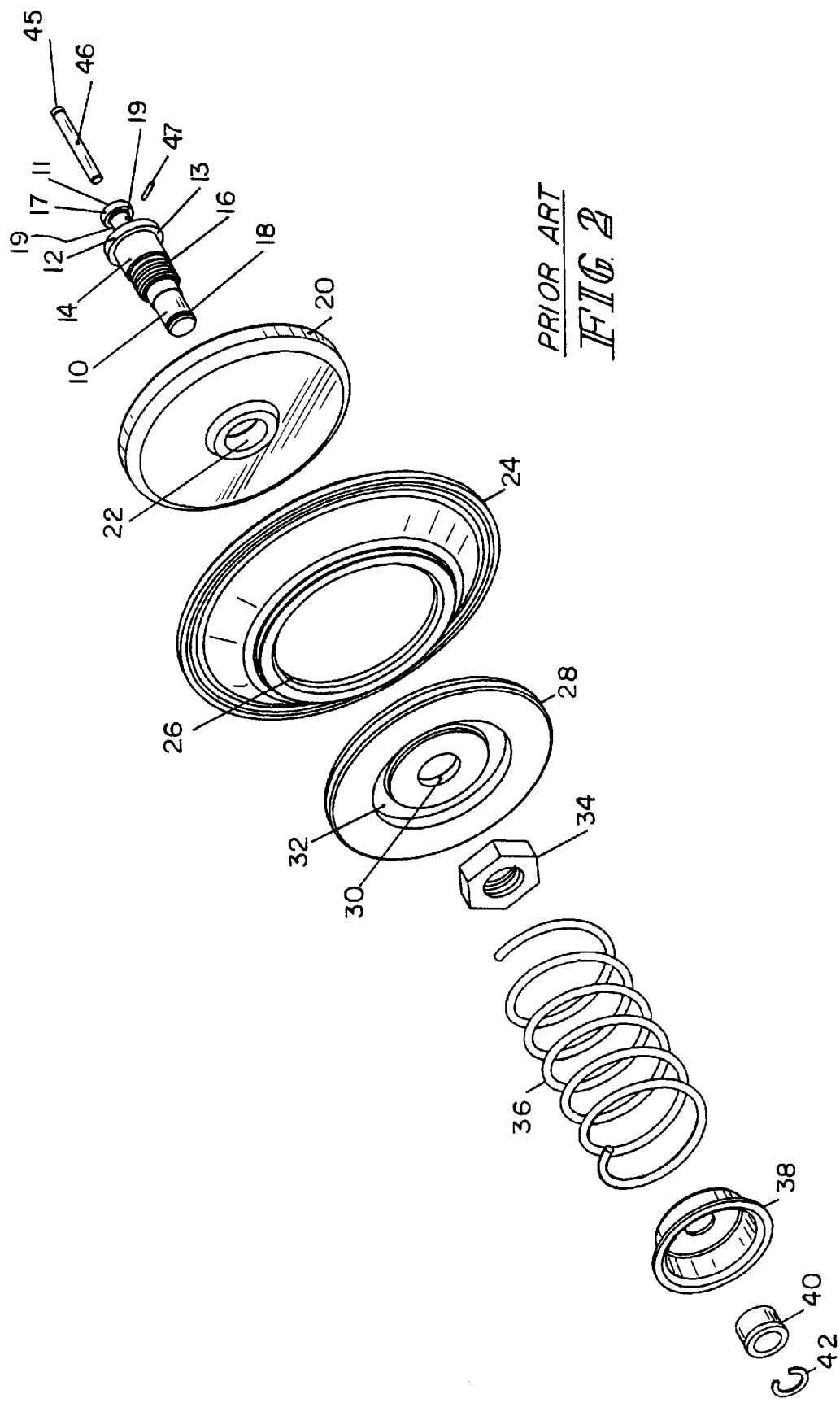
FIG. 2 is an exploded view of the diaphragm piston in FIG. 1.

In addition to the previously described portions of the diaphragm piston of the prior art of FIGS. 1 and 2 further details will be explained. Post 10 includes a head 12 forming a shoulder 13 with a body portion 14. A threaded portion 16 receives the nut 34. A recess 18 in the post 10 receives the C-ring 42. The body 20 includes an orifice 22 to receive the body portion 14 of the post 10. The diaphragm 24 includes an orifice 26. The plate 28 includes an orifice 30 and a recess 32 to receive the spring 36. The spring seat 38, retainer 40 and C-ring 42 are also shown.

Post 10 includes a guide 17 with a stem 45 inserted into orifice 11 and secured to the post 10 by pin 47. Pin 47 is secured into stem 45 and is retained by orifices 19. The stem 45 includes a head 43 and a reduced diameter position 48 with a stem-shoulder 44 therebetween. The head 43 is the guiding surface in the bushing of a valve seat (shown in phantom in FIG. 1). The reduced diameter portion 48 with the bushing defines an air passage in the valve seat. Once the head 43 is out of the bushing, there is no guiding contact except if the stem 45 moves laterally. In which case, the stem-shoulder 44 will catch the top of the valve seat causing damage during the valve closing.

The method of assembly of the prior art includes positioning the diaphragm 24 between body 20 and plate 28 and inserting the post 10 therethrough. The nut 34 is threadably received on thread 16 of post 10, clamping the diaphragm 24 between the body 20 and the plate 28. Spring 36 is then placed around the post 10 as is spring seat 38 and retainer 40. The spring is then depressed until the C-ring 42 is aligned and can be received within the recess 18 of the post 10. Stem 45 is then inserted into post 10 and secured by pin 47.

DETAILED DESCRIPTION OF THE PREFERRED EMBODIMENTS

Figure 3:
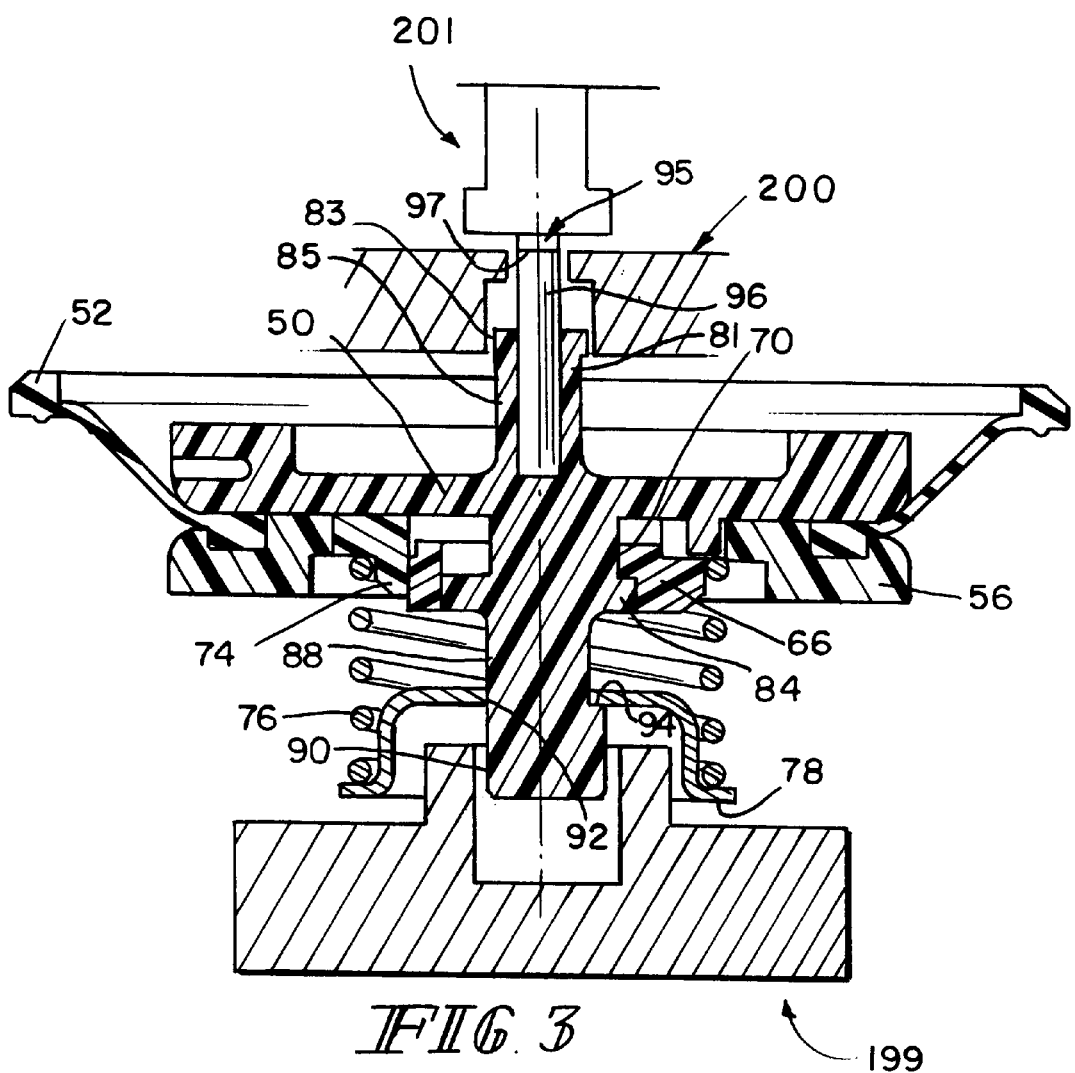
FIG. 3 is a cross-sectional view of a diaphragm piston according to the principles of the present invention.
Figure 4:
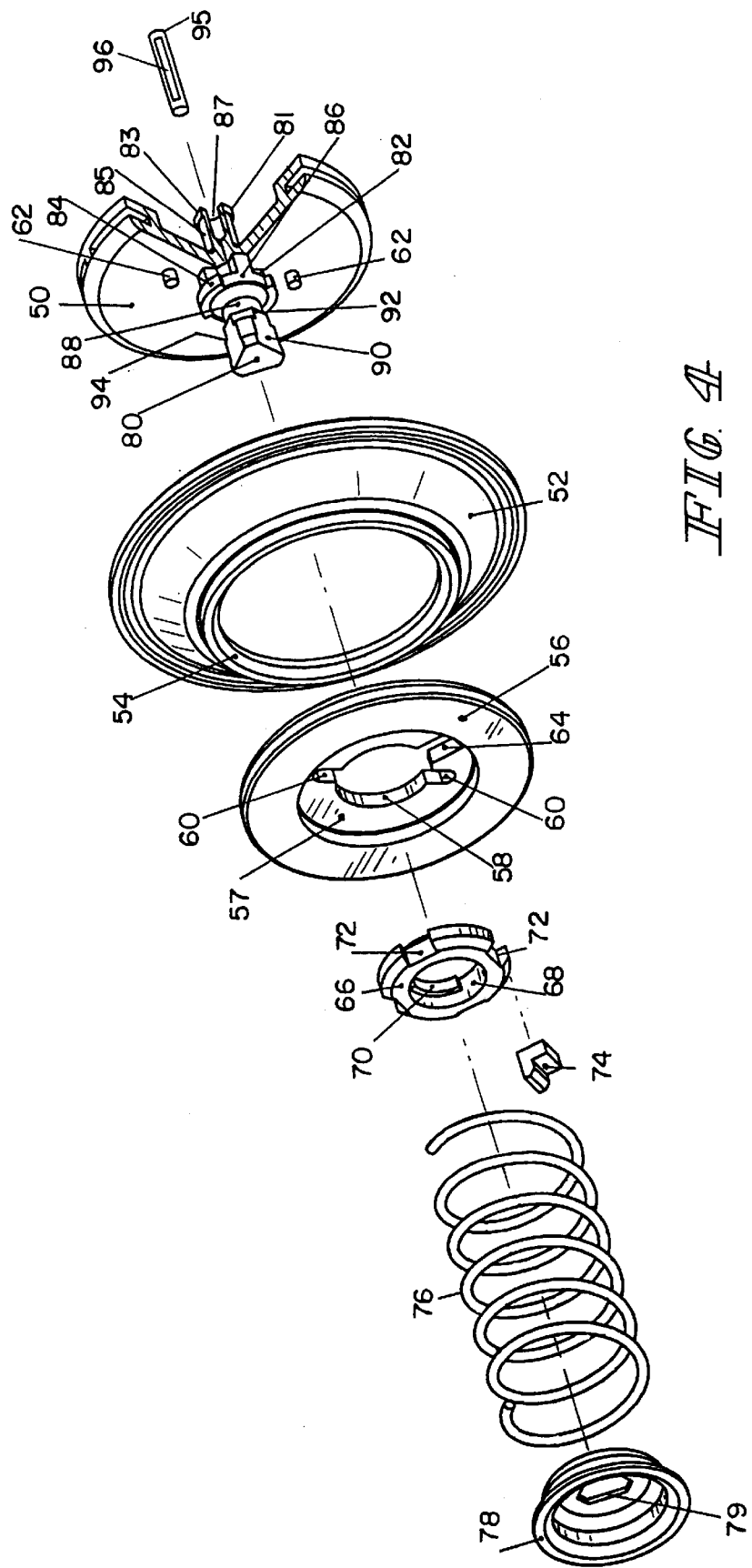
FIG. 4 is an exploded view of the diaphragm piston in FIG. 3.

A diaphragm piston of the present invention is illustrated in FIGS. 3 and 4. A diaphragm 52 is positioned between a body 50 and a plate 56. A center portion 57 of the plate 56 extends through an orifice 54 in the diaphragm 52. The center portion 57 includes an orifice 58 having both a pair of recesses 60 and a third recess 64. The recesses 60 receive pins 62 extending from the face of the base 50. This prevents rotation of the plate 56 relative to the body 50.

The body 50 also includes an integrally formed post 80. The post 80 has a first portion 82 with a rim 84 extending therefrom which forms a first shoulder. A pair of circumferential recesses 86 are provided in the rim 84. A nut 66 includes a center orifice 68 and a pair of radial tabs 70, only one of which is shown in FIGS. 3 and 4. The radial tabs 70 are aligned and received within the circumferential recesses 86 of the rim 84 and then rotated 90° such that the radial tabs are received under the rim 84 to engage the first shoulder. This locks the plate 56 to the body 50 and the diaphragm 52 there between. The nut or stop 66 also includes radial recesses 72. When one of the recesses 72 on the nut 66 is aligned with the recess 64 in the plate 56, a key 74 is inserted in both of the recesses to thereby lock the nut 66 from rotation.

The diaphragm piston also includes a spring 76 and a spring seat 78 with an orifice 79. The post 80 includes a reduced diameter section 88 extending from the rim 84. A generally hexagonal portion 92 and a generally triangular section 90 formed the end of the post 80. Although a hexagonal cross-section 92 and a triangular cross section 90 are shown, both of them may be any polygonal shape as long the polygonal shape of 92 has more sides than that of 90. The orifice 79 is also a polygonal shape and may be, for example, a triangle which would slide past the triangular portion 90 and when rotated, come to rest against a second shoulder, which is 94 formed between the hexagonal shape 92 and the triangular shape 90. The orifice 79 may be for example, a triangular shape or an irregular hexagonal shape.

After the spring 76 is inserted around the post 80, one end is received in the recess 57 of the plate 56. The spring seat 78 is then also inserted onto post 80 compressing the spring 76. As discussed previously, the spring seat 78 is moved passed the triangular section 90 onto the hexagonal section 92. Then it is rotated for example, 60° until the body of the spring seat 78 rests against the second shoulder 94. It should be noted that the spring 76 also engages the key 74 and retains it in the recesses 72 and 64. In the assembled condition, the spring seat 78 will come to rest against a base 199.

The body 50 also includes an integrally formed guide 81 which includes orifice 87. The guide 81 has a first shoulder 83 which is for example, a triangular shape or an irregular hexagonal shape. The guide 81 also includes a reduced diameter section 85. A stem 95 is loosely seated into orifice 87. The stem 95 has two or more flats 96 which are circumferentially spaced and do not extend axially to the ends of the stem. The portions of the stem 95 between the flats 96 are the same diameter as the non-flattened head portion 97. Thus, the stem is in guiding contact with the bushing of the valve seat 200 as the stem operates to raise the valve element 201. The flats provide an air passage of the same cross-sectional area as the reduced diameter portion 48 of prior art stem 45 of FIGS. 1 and 2. This configuration of stem 95 prevents the catching and damage of the prior art stems. The stem 95 may be used by itself as a replacement of stem 45 in the prior art diaphragm piston.

A substantial reduction in costs results from making the base 50 with the integral post 80, the plate 56, the nut 66 and the key 74 from plastic. These molded products may be made of composite plastics, for example, Verton. The diaphragm 52 is rubber and preferably fabric reinforced. The spring 76 may be for example, musical wire. The spring seat 78 may be steel. The spring 76 and the spring seat 78 may be zinc plated. The stem 95 may be stainless steel.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A diaphragm piston comprising:
    a diaphragm between a body and a plate;
    an unthreaded post formed integrally with the body so as to create a monolithic, one-piece structure;
    the post having at least two shoulders integrally formed thereon and extending from the body through apertures in the diaphragm and the plate;
    a stop coupled to the post and engaging a first shoulder and thereby limiting axial movement of the plate in a direction away from the body;
    a spring seat coupled to the post and engaging a second shoulder; and a spring between the plate and the spring seat.

2. A piston according to claim 1, wherein the post includes a shoulder; and the spring seat includes an orifice shaped to move axially on the post past the shoulder and rotate about the post and engage the shoulder.

3. A piston according to claim 1, wherein the body with post, plate and stop are made of plastic.

4. A piston according to claim 1, wherein the post has a first section proximate to the body, the first section having a cross-section, and an intermediate section bordering the first section, the intermediate section having a larger cross-section than the cross-section of the first section at a border of the first section and the intermediate section, whereby a first shoulder is formed where the first section borders the intermediate section; and the stop engages the first shoulder.

5. A piston according to claim 4, wherein the stop includes an orifice shaped to move axially on the post past the intermediate section, then rotate about the first shoulder of the post and thereby engage the first shoulder.

6. A piston according to claim 1, including a lock preventing rotation between the plate and the body.

7. A piston according to claim 6, wherein the lock includes at least one pin and one recess, one of which is integral to the plate and one of which is integral to the body.

8. A piston according to claim 1, including a guide integral with and extending from the body in a direction opposite the direction the post extends from the body; and a stem seated in and extending from an orifice in the guide.

9. A piston according to claim 8, wherein the stem has a uniform diameter with flats circumferentially spaced and displaced from an end of the stem.

10. A valve having a valve element resting on a valve seat and a diaphragm piston for moving the valve element relative to the valve seat, the diaphragm piston comprising:
    a diaphragm between a body and a plate;
    an unthreaded post formed integrally with the body so as to create a monolithic, one-piece structure, the post having at least two shoulders integrally formed thereon and extending from the body through apertures in the diaphragm and the plate;
    a stop coupled to the post and engaging a first shoulder, thereby limiting axial movement of the plate in a direction away from the body;
    a spring seat coupled to the post and engaging a second shoulder; and a spring between the plate and the spring seat.

11. A valve according to claim 10, including a guide formed integrally with the body so as to create a monolithic, one-piece structure, the guide extending from the body in a direction opposite the direction the post extends from the body; and a stem seated in and extending from an orifice in the guide.

12. A valve according to claim 11, wherein the stem has a uniform diameter with flats circumferentially spaced and displaced from an end of the stem.

13. A diaphragm piston comprising:
   a diaphragm between a body and a plate;
   a post formed integrally with the body so as to create a monolithic, one-piece structure;
   the post extending from the body through apertures in the diaphragm and the plate;
   a stop coupled to the post and thereby limiting movement of the plate only in a direction away from the body;
   a lock preventing only rotation between the plate and the body, the lock including at least one pin and at least one recess, wherein prior to assembly the pin is integrally formed with one of the body and plate, and the recess is integral to the other of the plate and the body.

14. A diaphragm piston comprising:
   a diaphragm between a body and a plate;
   a post formed integrally with the body so as to create a monolithic, one-piece structure;
   the post extending from the body through apertures in the diaphragm and the plate, and including a first section proximate to the body, the first section having a first cross-section;
   an intermediate section bordering the first section, the intermediate section having a generally-polygonal cross-section that is larger than the cross-section of the first section where the first section borders the intermediate section, whereby a first shoulder is formed where the first section borders the intermediate section; and
   a stop coupled to the post by engaging the first shoulder, thereby limiting movement of the plate in a direction away from the body.

15. A diaphragm piston comprising:
   a diaphragm between a body and a plate;
   a post formed integrally with the body so as to create a monolithic, one-piece structure;
   the post extending from the body through apertures in the diaphragm and the plate, and including
   a first section proximate to the body, the first section having a cross-section,
   an intermediate section bordering the first section, the intermediate section having a first polygonal cross-section larger than the cross-section of the first section where the first section borders the intermediate section, whereby a first shoulder is formed where the first section borders the intermediate section,
   a second section distal to the plate and abutting the intermediate section and having a second polygonal cross-section larger than the cross-section of the intermediate section where the second section borders the intermediate section, whereby a second shoulder is formed where the intermediate section borders the second section,
   a stop coupled to the post by engaging the first shoulder, thereby limiting movement of the plate in a direction away from the body;
   a spring seat coupled to the post and engaging the second shoulder; and,
   a spring between the plate and the spring seat.

16. A piston according to claim 15, wherein the stop and spring seat each include an orifice, and the orifice on the stop is shaped to move on the post past the first and second shoulders, and then rotate about the post to engage the first shoulder, and the orifice on the spring seat is shaped to move axially on the post past the second shoulder, then rotate about the post to engage the second shoulder.

17. A piston according to claim 16, including a first lock preventing rotation between the stop and the plate.

18. A piston according to claim 17, wherein the lock includes a recess on both the stop and the plate and a key inserted in the recesses when aligned.

19. A piston according to claim 18, wherein the spring retains the key in the recesses.

20. A piston according to claim 18, wherein the body with post, plate, stop and key are made of plastic.

21. A piston according to claim 17, including a second lock preventing rotation between the plate and the post.

22. A piston according to claim 21, wherein the second lock includes at least one pin and one recess, one of which is on the plate and one of which on the body.

23. A diaphragm piston comprising:
   a diaphragm between a body and a plate;
   an unthreaded post formed integrally with the body so as to create a monolithic, one-piece structure;
   the post extending from the body through apertures in the diaphragm and the plate, and including
   a first section proximate to the plate and bordering a second section distal to the plate, the first section having a cross-section smaller than a cross-section of the second section where the first section borders the second, whereby a shoulder is formed where the first section borders the second section;
   a spring seat having an orifice therein formed to move axially past the second section, then rotate about the post to become coupled to the post by engaging the shoulder; and,
   a spring between the plate and the spring seat.

24. A diaphragm piston comprising:
   a diaphragm between a body and a plate;
   a post formed integrally with the body so as to create a monolithic, one-piece structure;
   the post extending from the body through apertures in the diaphragm and the plate and having a first section proximate to the body, the first section having a cross-section, and an intermediate section bordering the first section, the intermediate section having a larger cross-section than the cross-section of the first section at a border of the first section and the intermediate section, whereby the first shoulder is formed where the first section borders the intermediate section, the first shoulder including at least one circumferential recess;
   a stop including an orifice shaped to move axially on the post past the intermediate section, then rotate about the first shoulder of the post and thereby engaging the first shoulder and limiting axial movement of the plate in a direction away from the body, and including at least one radial tab, each radial tab being smaller than the at least one recess;
   a spring seat coupled to the post;
   a spring between the plate and the spring seat.

25. A diaphragm piston comprising:
   a diaphragm between a body and a plate;
   a post formed integrally with the body so as to create a monolithic, one-piece structure;
   the post extending from the body through apertures in the diaphragm and the plate, the post having a portion distal from the body having a generally polygonal cross-section, and an intermediate portion bordering the distal portion and having a polygonal cross-section, the cross-section of the distal portion having fewer sides than the cross-section of the intermediate portion, thereby forming a shoulder where the distal portion borders the intermediate portion;

a stop coupled to the post and thereby limiting axial movement of the plate in a direction away from the body;

the spring seat including an orifice shaped to move axially on the post past the shoulder and rotate, thereby coupling to the post by engaging the shoulder;

a spring between the plate and the spring seat.

26. A piston according to claim 25, wherein the orifice in the spring seat has at least three sides.

27. A piston according to claim 25, wherein the orifice in the spring seat has six sides.

28. The diaphragm piston as in claim 25, wherein the cross-section of the distal portion is triangular.

29. The diaphragm piston as in claim 25, wherein the cross-section of the intermediate portion is hexagonal.

30. A valve having a valve element resting on a valve seat, and a diaphragm piston including a stem which rides in the valve seat and engages and moves the valve element relative to the valve seat, the stem comprising:

first and second end portions having a predetermined distance across a substantially uniform cross section;

an intermediate portion disposed between the first and second end portions having a cross section of reduced area defined by at least one flat, the intermediate portion having the same predetermined distance across its cross-section, the at least one flat extending along a longitudinal axis of the stem, the flat displaced from the first and second end portions to define with the valve seat a passage while maintaining guiding contact between the first portion and the valve seat.

31. A valve according to claim 30, including a plurality of flats extending along an axis of the stem, the flats circumferentially spaced and displaced from the first portion while maintaining guiding contacts between the first portion and the valve seat.

\* \* \* \* \*